(12) United States Patent
Lee et al.

(10) Patent No.: US 11,308,777 B2
(45) Date of Patent: Apr. 19, 2022

(54) IMAGE CAPTURING APPARATUS WITH VARIABLE EVENT DETECTING CONDITION

(71) Applicant: HANWHA TECHWIN CO., LTD., Seongnam-si (KR)

(72) Inventors: Young Chan Lee, Seongnam-si (KR); Dong Jun Lee, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/437,135

(22) Filed: Jun. 11, 2019

(65) Prior Publication Data

US 2019/0295393 A1    Sep. 26, 2019

Related U.S. Application Data

(63) Continuation of application No. PCT/KR2017/014016, filed on Dec. 1, 2017.

(30) Foreign Application Priority Data

Dec. 27, 2016    (KR) .................. 10-2016-0180008

(51) Int. Cl.
*G06F 16/73*    (2019.01)
*G08B 13/196*    (2006.01)
(Continued)

(52) U.S. Cl.
CPC ....... *G08B 13/19669* (2013.01); *G06F 16/00* (2019.01); *G06F 16/73* (2019.01);
(Continued)

(58) Field of Classification Search
CPC ... G08B 13/19669; G06F 16/73; G06F 16/00; G06F 17/30321; G06F 16/2228;
(Continued)

(56) References Cited

U.S. PATENT DOCUMENTS 5,909,548 A * 6/1999 Klein ............... G08B 13/19604
709/217
9,256,955 B2    2/2016 O'Gorman et al.
(Continued)

FOREIGN PATENT DOCUMENTS

CN    101355638 A    1/2009
CN    103634552 A    3/2014
(Continued)

OTHER PUBLICATIONS

International Search Report (PCT/ISA/210) dated Mar. 2, 2018 issued by the International Searching Authority in International Application No. PCT/KR2017/014016.
(Continued)

*Primary Examiner* — Hai Phan
*Assistant Examiner* — Anthony D Afrifa-Kyei
(74) *Attorney, Agent, or Firm* — Sughrue Mion, PLLC

(57) ABSTRACT

Provided are an event storage device, an event search device, and an event alarm device for an event occurring in a surveillance area. The event storage device includes a processor and a memory and its operation is controlled by the processor. The processor is configured to receive images captured in a surveillance area, detect an event generated in the surveillance area, storing, in the memory, an image related to the event, among the captured images, and storing an event level of the detected event along with the stored image.

18 Claims, 12 Drawing Sheets

(51) Int. Cl.
  *G06K 9/00* (2022.01)
  *H04N 1/32* (2006.01)
  *G06F 16/00* (2019.01)
  *H04N 5/77* (2006.01)
  *H04N 5/232* (2006.01)

(52) U.S. Cl.
  CPC ..... *G06K 9/00718* (2013.01); *G06K 9/00771* (2013.01); *H04N 1/32* (2013.01); *H04N 1/32128* (2013.01); *H04N 5/232* (2013.01); *H04N 5/77* (2013.01); *G06K 2009/00738* (2013.01)

(58) Field of Classification Search
  CPC .. G06F 16/951; G06F 17/30864; G06F 16/90; G06K 9/00718; G06K 9/00771; G06K 2009/00738; H04N 1/32; H04N 1/32128; H04N 5/232; H04N 5/77; H04N 7/181
  See application file for complete search history.

(56) References Cited

U.S. PATENT DOCUMENTS

| | | | | |
|---|---|---|---|---|
| 9,454,827 | B2* | 9/2016 | Deng | G06T 5/009 |
| 2004/0086152 | A1* | 5/2004 | Kakarala | G06T 7/254 |
| | | | | 382/103 |
| 2010/0054540 | A1* | 3/2010 | Brown | G06K 9/2081 |
| | | | | 382/107 |
| 2013/0188094 | A1* | 7/2013 | Samadani | H04N 5/272 |
| | | | | 348/584 |
| 2017/0024998 | A1* | 1/2017 | Liu | G08B 29/185 |
| 2018/0082413 | A1* | 3/2018 | Saito | G06T 7/001 |

FOREIGN PATENT DOCUMENTS

| | | |
|---|---|---|
| JP | 2010-103782 A | 5/2010 |
| KR | 10-2008-0030304 A | 4/2008 |
| KR | 10-2015-0065847 A | 6/2015 |
| WO | 2012/046899 A1 | 4/2012 |
| WO | 2012/050244 A1 | 4/2012 |
| WO | 2015/072631 A1 | 5/2015 |

OTHER PUBLICATIONS

Written Opinion (PCT/ISA/237) dated Mar. 2, 2018 issued by the International Searching Authority in International Application No. PCT/KR2017/014016.

Communication dated Jun. 2, 2020 issued by the State Intellectual Property Office of P.R. China in counterpart Chinese Application No. 201780077927.7.

Communication dated Jul. 19, 2021 by the State Intellectual Property Office of P.R. China in counterpart Chinese Patent Application No. 201780077927.7.

* cited by examiner

FIG. 4

| TIME | SUN | | MON | | TUE | |
|---|---|---|---|---|---|---|
| | AUDIO | MOTION | AUDIO | MOTION | AUDIO | MOTION |
| 00 | | | | | | |
| 01 | 20% email 1 per 10 events | 30% email 1 per 10 events | | | | 30% email 1 per 10 events |
| 02 | | 70% email & push 1 per 5 events | off | off | Siren email & push 1 per 5 events | |
| 03 | off | | | | | 70% email & push 1 per 5 events |
| 04 | | | 30% email 1 per 10 events | 30% email 1 per 10 events | 30% email 1 per 10 events | |
| 05 | | | | | | |

IMAGE CAPTURING APPARATUS WITH VARIABLE EVENT DETECTING CONDITION

CROSS-REFERENCE TO THE RELATED APPLICATION

This application is a continuation of International Application No. PCT/KR2017/014016, filed Dec. 1, 2017 which claims priority from Korean Patent Application No. 10-2016-0180008 filed on Dec. 27, 2016, in the Korean Intellectual Property Office, the disclosures of which are incorporated herein in their entirety by reference

BACKGROUND

1. Field

Apparatuses consistent with exemplary embodiments of the inventive concept relate to a storage device, a search device, and an alarm device for an event occurring in a surveillance area.

2. Description of the Related Art

Surveillance systems are widely used in various places including banks, department stores and residential areas for crime prevention and security purposes. The surveillance systems are also used to monitor a pet or child indoors in real time. One of the most used surveillance systems is a closed circuit television (CCTV) system in which a camera is installed at an appropriate position to capture images of an area to be monitored and a user can monitor the images captured by the camera.

An image pickup apparatus measures an event, for example, by measuring the amount of change in a sensor detection signal and detecting a motion from an image. In a surveillance system, when an event occurs, it stores metadata including event information together with an image captured at the time of occurrence of the event. The stored metadata is used by the user to retrieve the stored image afterwards.

Since the surveillance system generally stores images and metadata according to whether or not an event has occurred, the user must sequentially view the stored images to retrieve the event. In order to shorten the event search time, video analytics (VA) and the like may be performed. However, if the amount of stored images is large, the time required for retrieving a desired event becomes long even though VA is performed.

Also, in the surveillance system, event related information stored therein is listed in order of event occurrence time and is provided to the user. When the event related information is provided in this manner, it is easy to view all the events that occur sequentially. However, if there are too many events which have occurred, it is difficult to know which events are important events.

In addition, for an event alarm, a sensor amount or motion exceeding a predetermined reference value must be detected, and the reference value is generally a fixed value and is not adjusted. Accordingly, since an excessive number of event alarms may occur more than necessary in some situations and an insufficient number of event alarms may occur in some other situations, it is impossible to ensure appropriateness of the event alarm frequency, which is problematic.

SUMMARY

Exemplary embodiments of the inventive concept provide a device for storing an event level along with an image captured in a surveillance area. The exemplary embodiments also provide a method of defining the event level and calculating the event level.

The exemplary embodiments provide a device for searching for an event using an event level in a stored image. The exemplary embodiments also provide a method of defining an event attribute and searching for an event using a search requirement for an event attribute.

The exemplary embodiments provide an event alarm device capable of adjusting an alarm frequency according to an event level. The exemplary embodiments also provide a method of setting a request level, which is an alarm generation condition, differently over time. Further, the exemplary embodiments provide an event alarm device capable of adjusting an alarm frequency of an event which a user is interested in.

According to an exemplary embodiment, there is provided an event storage device including a processor and a memory, wherein the processor is configured to: receive images captured in a surveillance area; detect an event generated in the surveillance area; store, in the memory, an image related to the event, among the received images; and store an event level of the detected event along with the stored image.

According to an exemplary embodiment, there is provided an event search device including a processor and a memory, wherein the processor is configured to: read events related to images stored in the memory; read event levels of the read events from the memory; receive a search requirement for at least one event attribute; retrieve an image related to an event satisfying the search requirement from among the stored images; and display the retrieved image.

According to an exemplary embodiment, there is provided an event alarm device including a processor and a memory, wherein the processor is configured to: receive a request level for an event level; receive an image captured in a surveillance area; detect an event from the surveillance area; calculate an event level of the detected event; store the calculated event level in the memory; and output an alarm for the detected event in response to determining that the event level satisfies the request level.

According to the exemplary embodiments, there are at least the following advantageous effects. It is possible to store all events occurring in a surveillance area and images thereof. It is also possible to retrieve images for all events without omission. Since an event level is stored along with a captured image, it is possible to retrieve an event according to the event level. That is, an event can be retrieved according to the event level, and further, an event can be retrieved according to the frequency and duration of the event. Therefore, it is possible to retrieve an event quickly and efficiently compared with a conventional case of retrieving an event in the time order.

In addition, since the frequency of event alarms can be adjusted differently according to the event level, it is possible to prevent an excessive number of alarms from occurring for all events.

Further, since a request level for the alarm frequency can be set according to the time, it is possible to set the request level suitable for the schedule and the life pattern of the user, and it is possible to receive the alarm corresponding thereto.

Furthermore, since the user can designate the user's interest event for an event alarm and provide feedback, it is possible to adjust the alarm frequency with respect to the user's interest event by feedback.

Advantageous effects according to the exemplary embodiments are not limited to those mentioned above, and various other advantageous effects are included herein.

DESCRIPTION OF THE DRAWINGS

FIG. 4 illustrates a table showing an event schedule of an image pickup apparatus, according to an embodiment.

DESCRIPTION OF THE EXEMPLARY EMBODIMENTS

Figure 1:
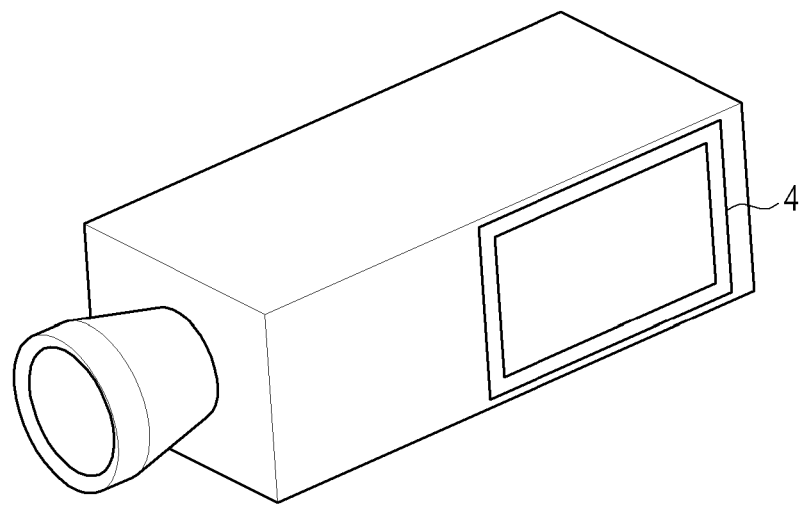
FIG. 1 illustrates an overall configuration of an image pickup apparatus according to an embodiment.

Advantages and features of the inventive concept and a method of achieving the same should become clear with the embodiments described in detail below. The embodiments of the inventive concept described herein are all exemplary, and thus, the inventive concept is not limited to these embodiments and may be realized in various other forms. The embodiments make the disclosure complete and are provided to completely inform one of ordinary skill in the art, to which the inventive concept pertains, of the scope of the disclosure. The inventive concept is defined only by the scope of the claims. Like reference numerals refer to like elements throughout.

Unless otherwise defined, all terms including technical and scientific terms used herein have the same meaning as commonly understood by one of ordinary skill in the art to which the inventive concept pertains. Terms, such as those defined in commonly used dictionaries, are not to be construed in an idealized or overly formal sense unless expressly so defined herein.

Terms used herein are for describing the embodiments and are not intended to limit the inventive concept. In the present specification, a singular expression includes a plural expression unless the context clearly indicates otherwise. "Comprises" and/or "comprising" used herein do not preclude the existence or the possibility of adding one or more elements other than those mentioned.

Hereinafter, various embodiments of the inventive concept will be described in detail with reference to the accompanying drawings.

FIG. 1 illustrates an overall configuration of an image pickup apparatus according to an embodiment. Referring to FIG. 1, an image pickup apparatus 1 according to an embodiment includes a camera which captures an image of a surveillance area. The camera may include a processor for logical operations, an input interface and a display 4 to capture and store an image of the surveillance area and allow the stored image to be searched and retrieved through the display 4 and an input interface.

Figure 2:
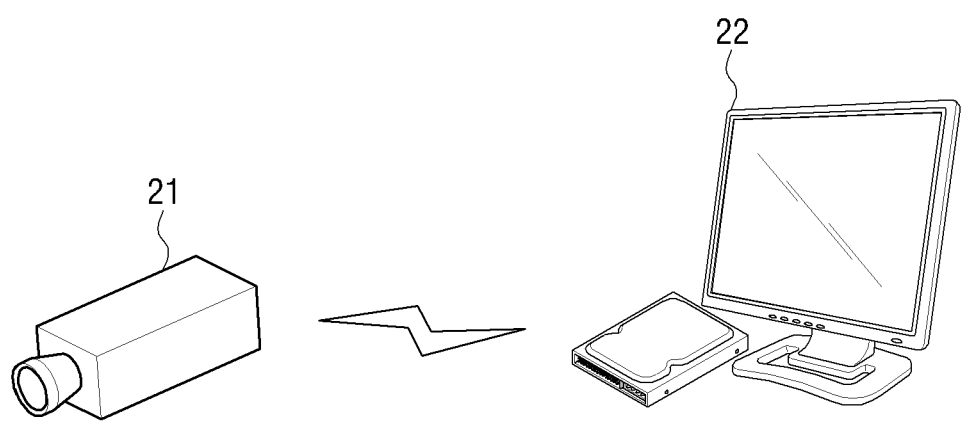
FIG. 2 illustrates an overall configuration of an image pickup apparatus according to another embodiment.

FIG. 2 illustrates an overall configuration of an image pickup apparatus according to another embodiment. Referring to FIG. 2, the image pickup apparatus 2 may allow a separate camera 21 to capture an image of the surveillance area. In this case, the camera 21 is connected to an image management device 22, which may be configured as a device such as a network video recorder (NVR) or a digital video recorder (DVR), through wired/wireless communication and transmits the captured image to the image management device 22. The image management device 22 provides the transmitted image through a display device such that the image can be stored and viewed, so that the user can search and retrieve the image.

Referring back to FIG. 1, the image pickup apparatus 1 may include various operation units, a storage medium and a component for providing an image to be viewed, and a camera, according to an embodiment.

Hereinafter, the components of the image pickup apparatus 1 according to an embodiment will be described in detail with reference to FIG. 3.

Figure 3:
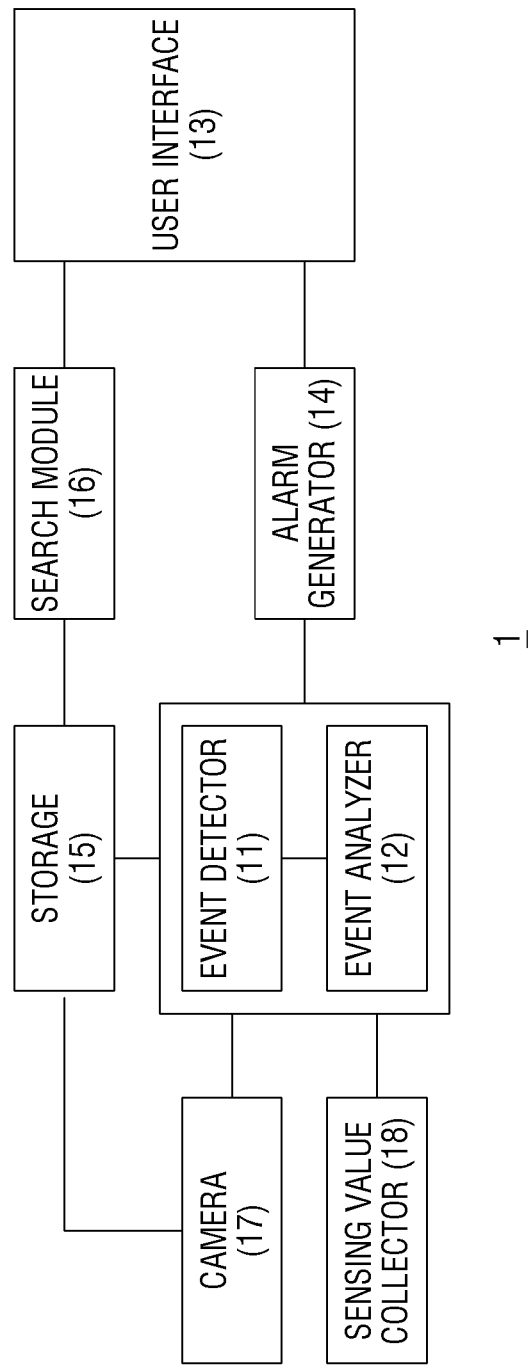
FIG. 3 is a block diagram showing a configuration of an image pickup apparatus according to an embodiment.

FIG. 3 is a block diagram showing a configuration of an image pickup apparatus according to an embodiment. Referring to FIG. 3, the image pickup apparatus 1 according to an embodiment may include a camera 17, a sensing value collector 18, an event detector 11, an event analyzer 12, an alarm generator 14, a user interface 13, a storage 15, and a search module 16. These components of the image pickup apparatus 1 may be connected to one another thorough wired and/or wireless connection.

The camera 17 is a component which captures an image of a surveillance area. The camera 17 cam be implemented by various types of camera modules such as a zoom type camera module, a dome type camera module, a pan/tilt/zoom (PTZ) camera module, an infrared (IR) camera module and a fisheye camera module, but it is not limited to the listed types of camera. As described in the other embodiments, the camera 17 may be configured to perform wired/wireless communication with the image management device 22 of FIG. 2, and may transmit the captured image to the image management device 22 of FIG. 2.

The camera 17 includes a lens system which receives and condenses light and an image sensor which obtains a valid signal from the light condensed by the lens system. Further, the camera 17 may further include an additional optical filter such as a day/night (D/N) filter. The image sensor may be a charge-coupled device (CCD), a complementary metal-oxide semiconductor (CMOS), or the like, but is not limited thereto.

The camera 17 captures an image from a surrounding subject, and transmits the captured image to an encoder to convert the captured image into a storable original image.

An encoder (not shown) is a component which converts an optical signal recognized by the image sensor into a storable form, and may include a video encoder such as a video graphics array (VGA) encoder. It is processed as an original image which is data that can be reproduced by being stored or transmitted through a video encoder.

The sensing value collector 18 is a component which collects at least one sensing value sensed or measured by at least one sensor which senses the surveillance area. The sensor may be mounted on the image pickup apparatus 1 or may be installed in the surveillance area separately from the image pickup apparatus 1. The sensor may be configured by at least one of an audio sensor, a passive infrared sensor (PIR sensor), a thermographic camera, a door sensor, a temperature sensor, a humidity sensor, a shock sensor and a network connection sensor, but is not limited thereto.

The audio sensor senses audio generated in the surveillance area. The audio sensor may be a microphone mounted on the image pickup apparatus 1, or a microphone installed in the surveillance area separately from the image pickup apparatus 1. The PIR sensor detects whether a person enters or exits the surveillance area by using an IR sensor. The PIR sensor may be installed at the entrance of the surveillance area. The thermographic camera serves as a sensor which senses heat radiating from the surveillance area using an IR camera. The door sensor is a sensor mounted on a door or window in the surveillance area, and detects an opening or closing state of the door or window. The temperature sensor measures temperature of the surveillance area, and the humidity sensor measures humidity of the surveillance area. The shock sensor is attached to the image pickup apparatus 1 or a specific apparatus, and detects an impact generated in the image pickup apparatus 1 or the specific apparatus. The network connection sensor detects a network connection state between the camera 17 and the image management device 22 when the camera 17 is configured to perform wired/wireless communication with the image management device 22 and transmit the captured image to the image management device 22.

The event detector 11 is a component which detects an event. The event refers to a situation in which a significant change which needs to be observed has occurred in the surveillance area. Types of event include a motion detection event, a face detection event, a shape detection event, an audio detection event, a human body detection event, a heat detection event, a door detection event, a temperature detection event, a humidity detection event, a shock detection event and a network connection detection event, but are not limited thereto.

The motion detection event refers to a case where a motion is detected in the surveillance area. The face detection event refers to a case where a face of a person is detected in the surveillance area. The shape detection event refers to a case where a specific shape is detected in the surveillance area. The audio detection event refers to a case where audio is detected in the surveillance area. The human body detection event refers to a case where entry/exit of a person is detected in the surveillance area. The heat detection event refers to a case where dissipation or transfer of heat is detected in the surveillance area. The door detection event refers to a case where a door or window of the surveillance area is opened or closed. The temperature detection event refers to a case where a change in the temperature of the surveillance area is detected, and the humidity detection event refers to a case where a change in the humidity of the surveillance area is detected. The shock detection event refers to a case where an impact is detected in the image pickup apparatus 1 or a specific apparatus in the surveillance area. The network connection detection event is a case where a disconnection of the network connection of the image pickup apparatus 1 is detected, and refers to a case where a disconnection of the network connection between the camera 17 and the image management device 22 is detected when the camera 17 is configured to perform wired/wireless communication with the image management device 22 and transmit the captured image to the image management device 22.

The event detector 11 may detect an event using an image captured by the camera 17 and a sensing value collected by the sensing value collector 18. In the motion detection event, the face detection event and the shape detection event, the event detector 11 may detect an event using an image captured by the camera 17. The event detector 11 may detect a motion detection event through a difference in luminance, illuminance or chromaticity between a previous frame and a current frame of the image. In addition, the event detector 11 may detect a face detection event and a shape detection event by extracting a shape through edge detection of a current frame and comparing the extracted shape with a reference image created through analysis of big data. In the audio detection event, the event detector 11 may detect an event using a sensing value collected by the audio sensor in the sensing value collector 18. Similarly, the event detector 11 may detect an event using a sensing value collected by the PIR sensor in the human body detection event, a sensing value collected by the thermographic sensor in the heat detection event, a sensing value collected by the door sensor in the door detection event, a sensing value collected by the temperature sensor in the temperature detection event, a sensing value collected by the humidity sensor in the humidity detection event, a sensing value collected by the shock sensor in the shock detection event, or a sensing value collected by the network connection sensor in the network connection detection event.

A space in which the event detector 11 detects an event corresponds to the surveillance area, but when a partial area of the surveillance area is preset by the user, only events occurring in the partial area can be selectively detected.

Further, the event detector 11 performs a function of calculating an event level. The event level is an indicator indicating the degree of occurrence of an event and is obtained by quantifying the event according to the amount of change between frames before and after the image captured by the camera 17 or the magnitude of the sensing value collected by the sensing value collector 18.

The event level may be defined according to the event type. In the motion detection event, the event level may be defined as an amount of change between a previous frame and a current frame of the image captured by the camera 17. The amount of change between the previous frame and the current frame may include an amount of change in luminance, illuminance, or chromaticity of the image. For example, in the case of capturing an image at VGA resolution (640×480) by the camera 17, an inter-frame variation calculation method can directly calculate a luminance difference between pixels of two VGA images, but the amount of calculation increases. Accordingly, by applying a 16×16 filter to each frame image to downsize it to an average value of the 16×16 image and calculating the luminance value from 256 levels down to 64 levels, the maximum luminance difference of 0 to 76,800 can be obtained. The value of 65,536 or more may be replaced by 65,535. A final output value of the inter-frame variation may be set to range from 0 to 65,535 using 16-bit output data. In this case, the event level of the motion detection event has a quantified indicator of 0 to 65,535.

In the face detection event and the shape detection event, the event level may be defined as accuracy of a detected face and a detected shape, respectively. For example, in the case of face detection, it is possible to determine whether the detected object is a human face through an algorithm such as a deep learning or neural network algorithm, and the event level may be defined as a percentage of accuracy when determining that the detected object is a human face. In this case, the event level of the face detection event and the shape detection event has a quantified indicator of 0 to 100.

In the audio detection event, the event level may be defined as a magnitude of audio measured by the audio sensor. When a 16-bit sound source is collected by the audio sensor, the magnitude of the audio has a value of −32768 to 32767, and the event level has a quantified indicator of 0 to 32767 excluding negative numbers.

In the heat detection event, the event level may be defined as a representative sensing value sensed by the thermographic sensor. The representative sensing value may be a maximum sensing value having the largest value among the sensing values of the surveillance area, a sensing value of a specific area of the surveillance area, or an average sensing value obtained by averaging the sensing values of the surveillance area. In this case, the event level may be quantified to a temperature range that can be measured by the thermographic sensor.

When an event is determined based on whether an event has occurred as in the shock detection event, the human body detection event, the door detection event and the network connection detection event, the event level may be defined as whether an event has occurred. In this case, the event level may be represented as an indicator of 0 when the event does not occur and an indicator of 1 when the event occurs. Alternatively, in the shock detection event, the event level may be defined as an amount of impact detected, depending on the type of the shock sensor. In this case, the event level may be quantified to an impact amount range that can be measured by the shock sensor.

In the temperature detection event and the humidity detection event, the event level may be defined as a temperature value and a humidity value measured by the temperature sensor and the humidity sensor, respectively. In this case, the event level may be quantified to a sensing value range that can be measured by each sensor. For example, if the temperature sensor has a sensing value range of −20° C. to 50° C., the event level may be quantified to a range of −128 to 127 using 8-bit output data.

The event level defined as described above may be expressed to the user in various ways. First, the event level may be represented as the magnitude of the detected event level without change. For example, when a motion detection event with an event level of 16384 is detected in a 16-bit image with the maximum event level of 65535, the event level may be represented as 16384, which is the detected value without change.

Second, the event level may be represented as a ratio of the event level to the maximum event level. For example, if a motion detection event with an event level of 16384 is detected in a 16-bit image with the maximum event level of 65535, the event level may be represented as 25%, which is a ratio of 16384 to 65535.

Third, the event level may be represented as a step for the maximum event level. For example, in a 16-bit image with the maximum event level of 65535, if the event level is divided into four levels, i.e., a first level of 0 to 16384, a second level of 16385 to 32768, a third level of 32768 to 49152 and a fourth level of 49153 to 65535, the event level of the motion detection event having an event level of 16384 may be represented as the first level.

The event analyzer 12 analyzes the detected event and acquires event contents. If the quantitative size of the event is analyzed by the event detector 11, the event analyzer 12 qualitatively analyzes the event to acquire event contents.

The event analyzer 12 may perform video analytics (VA) on the image captured by the camera 17 to acquire event contents, or may perform analysis on the audio sensed by the audio sensor. For example, the event analyzer 12 may compare audio data obtained through the audio sensor with big data to acquire a human voice, a gun sound, a siren, or a screaming sound as the event content. Alternatively, the event analyzer 12 may perform VA on the captured image to acquire a skin color, an age, wearing of a hat or glasses, a facial expression, identity and the like of a detected human as event contents.

The storage 15 stores an event occurrence time, an event type, an event level and event contents along with the image captured by the camera 17.

The storage 15 may store all the images captured by the camera 17. Alternatively, when an event is detected by the event detector 11, the storage 15 may store an image captured for a predetermined time after the occurrence of the event and/or an image captured for a predetermined time before the occurrence of the event.

Since the storage 15 must be able to store data, a storage medium must be used. Examples of the storage medium that can be used as the storage 15 may include a hard disk drive (HDD), a solid state drive (SSD), a compact flash (CF) card, a secure digital (SD) card and the like, but are not limited thereto. The storage 15 may be provided in a remote server such as a cloud server.

The user interface 13 is a component that provides a user with an image stored in the storage 15 so as to be viewed and receives a user's selection. Accordingly, the user interface 13 may be capable of displaying an image. Also, the user interface 13 may include an input means to receive a user's selection.

The search module 16 is a component provided for the user to retrieve an image stored in the storage 15. Accordingly, when a search command is input through the user interface 13, the image stored in the storage 15 is retrieved according to the input search command.

Since the event level and the event contents are stored in the storage 15 along with the image captured by the camera 17, various search conditions according to the event level and the event contents may be input from the user interface 13. The search module 16 retrieves the images stored in the storage 15 according to the input search conditions, and provides corresponding contents to the user interface 13. A detailed operation of the search module 16 through the user interface 13 will be described later with reference to FIGS. 6 to 11.

The alarm generator 14 is a component that serves to transmit an alarm to the user. Methods of sending an alarm to the user by the alarm generator 14 may include displaying a push alarm 141 (see FIG. 5) on a display device 4, transmitting an e-mail to the user, and generating a visual or sound signal through a separate light emitting diode (LED) light or speaker, but are not limited thereto.

The components using the display 4 in the image pickup apparatus 1 shown in FIG. 1 according to the embodiment may be implemented by sharing the same display 4. Further, the components using the input means may be implemented by sharing the same input means.

The display 4 used for the user interface 13, the search module 16 and the alarm generator 14 of the image pickup apparatus 1 according to the embodiment may be a display of a portable and mobile device such as a smartphone, a tablet PC, or a laptop for displaying an image, but is not limited thereto.

The input means used for the user interface 13 and the search module 16 of the image pickup apparatus 1 according to the embodiment may not provide a touch function, and in this case, the input means is separately provided. Generally, a mouse, a keyboard, a joystick and a remote control are the most widely used as the input means. If the touch function is provided, the input means may include a touch sensor. The touch sensor may be mounted integrally with the display 4, but it may not. The touch sensor senses a touch generated in the display 4, and detects coordinates of an area where the touch is generated, the number of touches, and an intensity of the touch. Even if the image pickup apparatus 1 provides a touch function, a separate touch pad may be provided if the display 4 does not include a touch sensor. The touch may be performed using a finger. However, without being limited thereto, a touch may be performed using a stylus pen with a tip through which a minute current can flow.

Since the event detector 11, the event analyzer 12, the alarm generator 14 and the search module 16 as described above must be able to perform basic logical operations, they may employ a semiconductor device capable of performing logical operations, such as a Central Processing Unit (CPU), a Micro Controller Unit (MCU), a microprocessor, a Field Programmable Gate Array (FPGA) and an Application Specific Integrated Circuit (ASIC), but the embodiments are not limited thereto.

The components of the image pickup apparatus 1 according to the embodiment have been described above. The image pickup apparatus 1 quantitatively calculates an event level through the event detector 11, and qualitatively analyzes and acquires event contents through the event analyzer 12. Therefore, when a specific event level and specific event contents are set as an alarm requirement, an alarm can be output at an appropriate frequency according to a desired event. Further, since the event level and link information for matching the event contents with the captured image are stored in the image pickup apparatus 1, when the user enters appropriate search criteria for the event contents and the event level, the user can effectively retrieve an image related to the event.

Hereinafter, an event alarm device and an event search device using an event level and event contents will be described. In the following description, it is assumed that a motion detection event and an audio detection event occur. It is also assumed that the event level is represented as a ratio to the maximum event level. These assumptions are for convenience of description and are not intended to limit the scope of the inventive concept.

First, an event alarm device using an event level and event contents will be described.

FIG. 4 illustrates a table showing an event schedule of an image pickup apparatus, according to an embodiment. Referring to FIG. 4, it illustrates a table showing an event schedule which provides criteria to allow the alarm generator 14 according to an embodiment to output an alarm.

In order to prevent an event alarm from occurring excessively or insufficiently, it is necessary to set an event schedule for setting an alarm request level, an alarm means and an alarm frequency as shown in FIG. 4.

The event schedule may be set by the user in the user interface 13 or a default value may be preset. The event schedule is stored in the storage 15 and can be called by the alarm generator 14. The event schedule may be stored in the storage 15 and may be loaded by the alarm generator 14. The alarm generator 14 receives the event level and the event contents from the event detector 11 and the event analyzer 12, respectively. When the event level and the event contents satisfy the alarm request level, the alarm generator 14 may output an alarm according to the alarm means and the alarm frequency.

The event schedule may be created for each slot and for each event type. It is possible to specify an event detection reference to be changed with respect to not only the time slot but also other environmental changes around the image pickup apparatus 1. FIG. 4 shows an event schedule table for an audio detection event (AUDIO) and a motion detection event (MOTION) as representative events.

The event schedule shown in the table in FIG. 4 is merely an example, and the user may edit the event schedule according to the environment. The user may use the user interface 13 when editing the event schedule.

Referring to FIG. 4, the event schedule is created such that the alarm request level of the audio detection event (AUDIO) from 0 to 4 o'clock on Sunday (SUN) is 20%, the alarm means is an e-mail transmission and an e-mail is transmitted every 10 events according to the frequency of the alarm. According to the event schedule, the alarm generator 14 does not output an alarm for the audio detection event after 4 o'clock.

In the motion detection event (MOTION), the alarm request level is set to 30% such that an alarm is output when an event having an event level of 30% or more is detected from 0 to 3 o'clock on Sunday (SUN). The alarm means is an e-mail transmission, and an e-mail is transmitted every 10 events according to the frequency of the alarm. The schedule for the motion detection event changes at 3 o'clock. According to the event schedule, when an event having the event level of 70% or more is detected, the alarm generator 14 transmits an e-mail and outputs a push alarm every 5 times of event occurrence.

In addition, an alarm is set to be output when a siren is detected as an event content from 0 to 4 on Tuesday (TUE). According to the event schedule, when the siren is detected as the event content, the alarm generator 14 outputs an e-mail transmission and a push alarm every five events.

In this manner, a separate event schedule can be created for the remaining dates and times, and the alarm generator 14 can output an alarm according to a predetermined criterion at a predetermined time according to the schedule.

The user can set the alarm request level, the alarm means and the alarm frequency through the event schedule, thereby preventing an alarm from occurring excessively. In addition, the user can receive an event alarm in a desired time slot through the event schedule.

Figure 5:
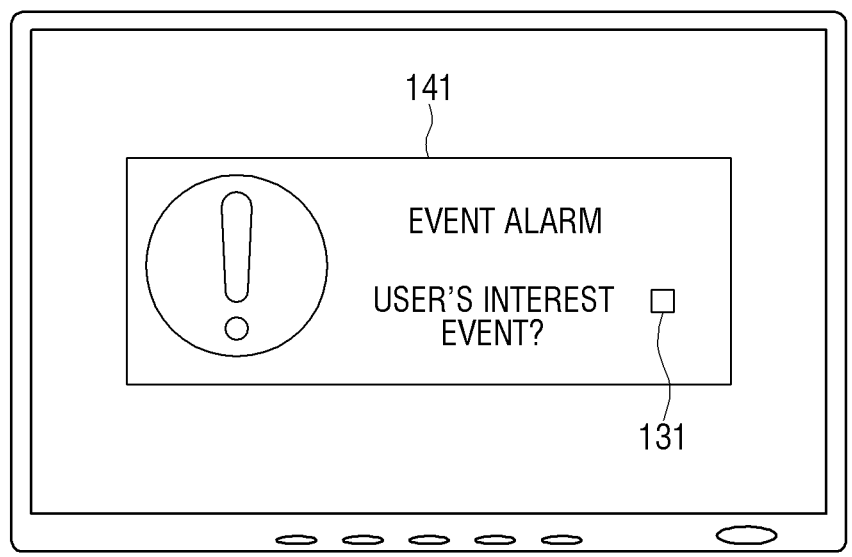
FIG. 5 illustrates a screen showing a push alarm informing occurrence of an event, according to an embodiment.

FIG. 5 illustrates a screen showing a push alarm informing occurrence of an event, according to an embodiment.

When the event occurs, the alarm generator 14 may display the push alarm 141 through the display device 4 as shown in FIG. 5.

The push alarm 141 may include a phrase or picture informing that an event has occurred, and may further include information for notifying the event content. Accordingly, the alarm generator 14 may further receive event related information such as a sensing value from the sensing value collector 18, and may notify the user of the event related information through the push alarm 141. The form of the push alarm 141 is not limited to the form shown in FIG. 5, and various modifications are possible.

The push alarm 141 may further display a message asking the user whether the user wants to designate the currently detected event as a user's interest event. The push alarm 141 may further display a check box 131 or a button enabling the user to decide whether to designate as a user's interest event.

When the user selects the check box 131 and designates it as an event of the user's interest, the image and the event schedule corresponding to the event are classified and stored in the storage 15.

By using the user's interest event, afterward, the user can sort and view only the images classified and stored as the user's interest event through the search module 16 in the user interface 13.

Further, by using the user's interest event, afterward, the user can sort and view only the event schedule classified and stored as the user's interest event in the user interface 13. The user can manually adjust the event schedule by referring to the classified and stored event schedule.

Also, the alarm generator 14 may automatically adjust the event schedule using the user's interest event. The alarm generator 14 may lower the alarm request level of a event when this event is designated as the user's interest event a reference number of times or more. On the other hand, the alarm generator 14 may raise the alarm request level of an event when this event is not designated as the user's interest event a reference number of times or more. For example, if the user designates the motion detection event as the user's interest event 10 times or more, the alarm generator 14 may adjust the event schedule so as to lower the alarm request level of the motion detection event by 5%. On the other hand, if the user does not designate the audio detection event as the user's interest event 10 times or more, the alarm generator 14 may adjust the event schedule so as to increase the alarm request level of the audio detection event by 5%. By automatically adjusting the alarm request level of the event schedule through the user's interest event, more or less alarms can be generated for an event according to the user's interest.

Similarly, the alarm generator 14 may change the alarm frequency of an event when this event is not designated or designated as the user's interest event a reference number of times or more. For example, when the user designates the motion detection event as the user's interest event 10 times or more, the alarm generator 14 may adjust the event schedule such that the alarm frequency of the motion detection event is increased by 5%. On the other hand, if the user does not designate the audio detection event as the user's interest event 10 times or more, the alarm section 14 may adjust the event schedule to reduce the alarm frequency of the audio detection event by 5%. Similarly, the alarm generator 14 may adjust the event schedule to change the alarm means using the user's interest event. By automatically adjusting the alarm frequency of the event schedule through the user's interest event, an alarm can be generated more or less frequently for an event according to the user's interest.

Next, an event search device using an event level and event contents will be described.

Figure 6:
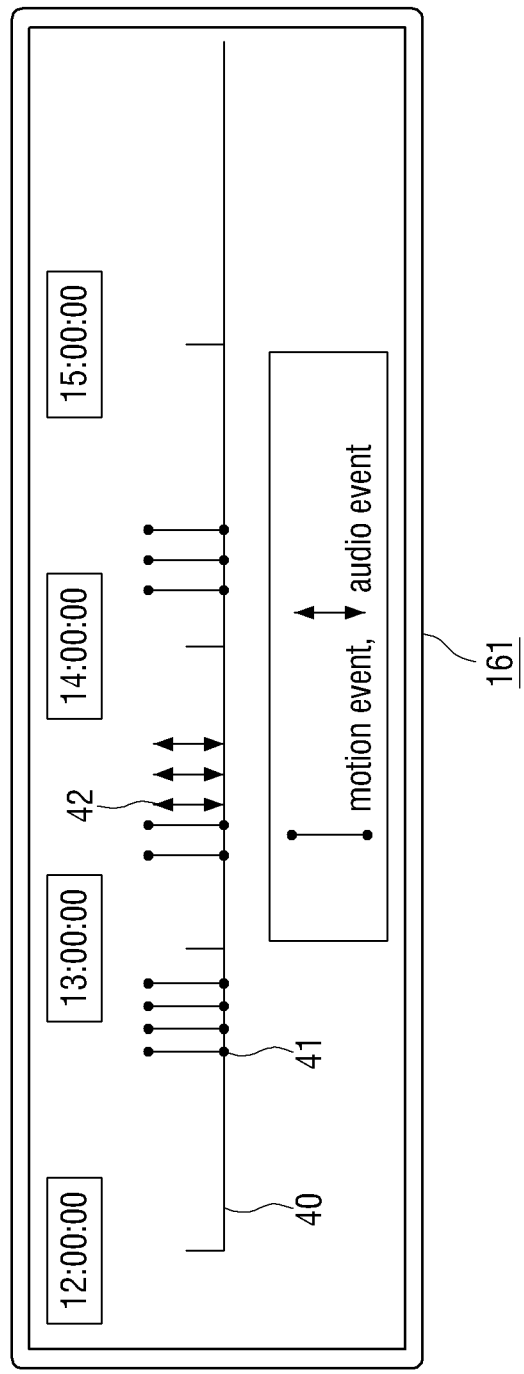
FIG. 6 illustrates an event listing screen according to time slots, according to an embodiment.

FIG. 6 illustrates an event listing screen according to time slots, according to an embodiment. Referring to FIG. 6, an event listing screen 161 shows the time slots which can be checked when retrieving an event through the user interface 13.

When the user operates the user interface 13 such that an event can be checked for each time slot, the image pickup apparatus 1 according to an embodiment sorts events stored in the storage 15 through the search module 16 according to the time slot. The sorted result is listed in the form of symbols on a timeline 40 through the display 4 included in the user interface 13. When the types of event are different, respective events may be represented by different symbols. In one embodiment, a motion event 41 is represented by a symbol having two circles connected to each other, and an audio event 42 is represented by a symbol having symmetrical arrows formed in both directions, but the shape and the manner of listing are not limited thereto.

The timeline 40 may be formed in a straight line so as to correspond to a later time as it goes from left to right along the straight line. Therefore, the search module 16 recognizes the time when each event occurs to arrange each of the events 41 and 42 at a corresponding time on the timeline 40 through the user interface 13.

The user may check the events 41 and 42 listed according to the time slot through the user interface 13, and select a symbol corresponding to each of the events 41 and 42 using the input means. Accordingly, the user can view a captured image corresponding to the event 41 or 42 through the display 4 of the user interface 13. Also, the user can view event contents corresponding to the event 41 or 42 through the display device 4 of the user interface 13 by selecting a symbol corresponding to each of the events 41 and 42 using the input means.

However, when an event is detected too frequently, it is difficult to know which event is an important event. When the time when an event has occurred is not an important criterion, and instead, an amount of a sensing value collected by the sensing value collector 18 is an important criterion, the event listing screen 161 is not an appropriate screen to view only important events.

Figure 7:
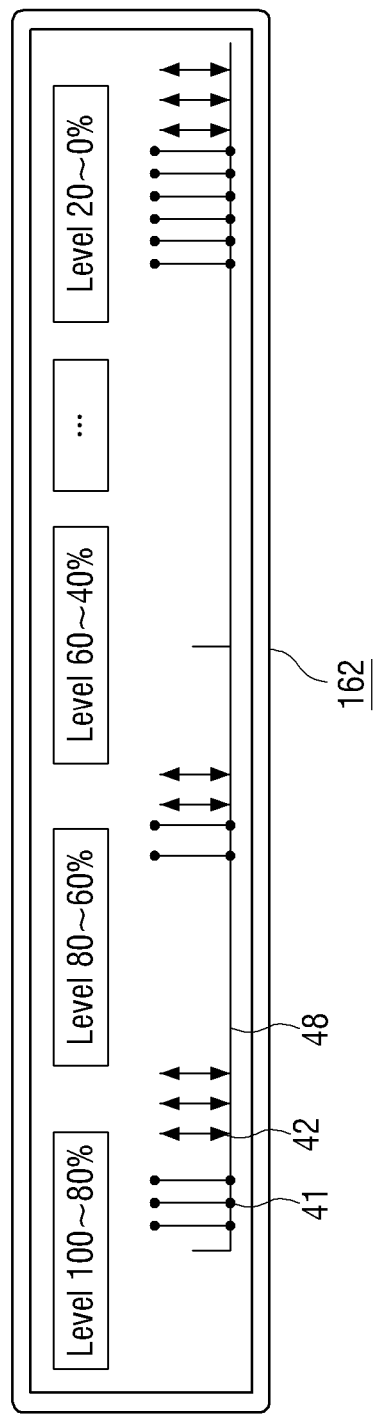
FIG. 7 is illustrates an event listing screen for each level, according to an embodiment.

FIG. 7 is illustrates an event listing screen for each level, according to an embodiment. Referring to FIG. 7, in order to overcome a disadvantage of the time-based event listing screen 161, an event listing screen 162 shows a level-based event listing provided by the image pickup apparatus 1.

In the level-based event listing screen 162, a horizontal line 48 which is the same as the timeline 40 in FIG. 6 is provided. However, unlike the timeline 40, events are listed in order of event levels. As illustrated in FIG. 7, the level-based event listing screen 162 is configured to correspond to a smaller event level as it goes from left to right.

When the user interface 13 is operated and determined such that the user can check an event according to an event level, the image pickup apparatus 1 according to an embodiment sorts events stored in the storage 15 through the search module 16 in order of event levels. The sorted result is listed in the form of symbols 41 and 42 on the horizontal line 48 through the display device 4 included in the user interface 13.

Accordingly, by selecting the events 41 and 42 listed according to the event level in the user interface 13 using the input means, the user can check how many important events have occurred and corresponding images and event contents. In addition, the user can check captured images in order of event levels through the level-based event listing screen 162.

Figure 8:
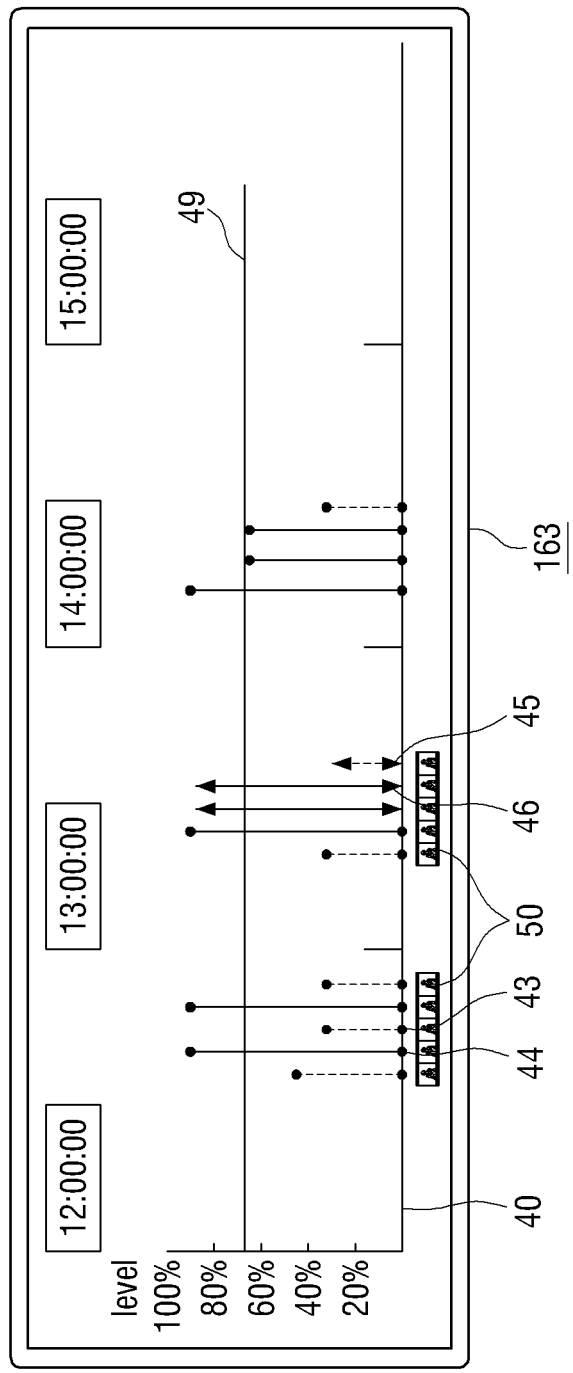
FIG. 8 illustrates an important event listing screen, according to an embodiment.

FIG. 8 illustrates an important event listing screen, according to an embodiment. Referring to FIG. 8, the image pickup apparatus 1 according to an embodiment of the present disclosure may further implement an important event listing UI 163. Since the important event listing screen 163 lists motion events 43 and 44, and audio events 45 and 46 in accordance with the timeline 40, it is basically similar to the event listing screen 161 according to the time slot.

The symbols indicating the motion events 43 and 44 and the audio events 45 and 46 may include a line segment having a length and feature points at both ends. Therefore, it is possible to enable the user to visually recognize an event level of the motion events 43 and 44, and the audio events 45 and 46.

The motion event 44 and the audio event 46 are considered important events that have sensing values exceeding a predetermined level. Therefore, the important event listing screen 163 can be configured by displaying only line segments longer than a certain length. FIG. 8 shows a straight line 49 which is parallel to and separated from the timeline 40, and the motion event 44 and the audio event 46 which extend beyond the straight line 49 are events to be displayed on the important event listing screen 163. The motion event 43 and the audio event 45 which are located below the straight line 49 are not displayed on the important event listing screen 163, or are displayed as dotted lines as shown in FIG. 8 to allow the user to recognize that they are not important events. Also, as shown in FIG. 8, a thumbnail 50 of an image for an event may be displayed for the important events, that is the motion event 44 and the audio event 46 so that the user can quickly grasp the contents of the important events.

Figure 9:
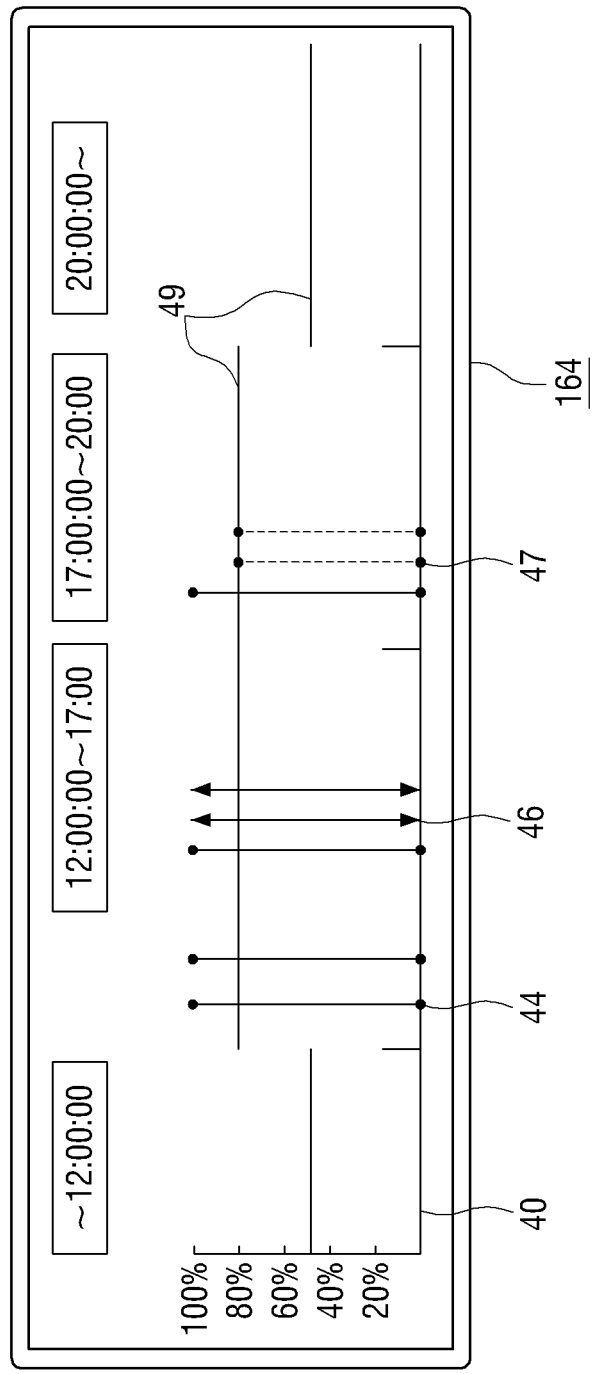
FIG. 9 illustrates a variable event listing screen according to time slots, according to an embodiment.

FIG. 9 illustrates a variable event listing screen according to time slots, according to an embodiment. Referring to FIG. 9, the image pickup apparatus 1 according to an embodiment may change the height of a baseline 49 in a variable event listing screen 164, which is used to determine important events, according to time slots.

Similarly to the important event listing screen 163 described with reference to FIG. 8, the motion event 44 and the audio event 46, which include line segments having a length greater than a distance between the baseline 49 and the timeline 40, may be displayed as the important events. An event 47 including a line segment having a shorter length may not be displayed or may be displayed as a dotted line or the like to indicate that it is not an important event.

Figure 10A:
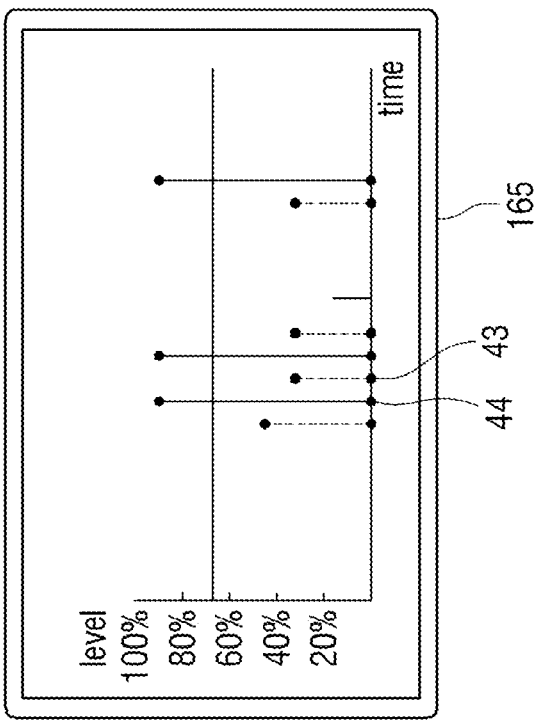
FIGS. 10A and 10B illustrate a screen showing an event level according to an embodiment and a screen showing event sensitivity, respectively.
Figure 10B:
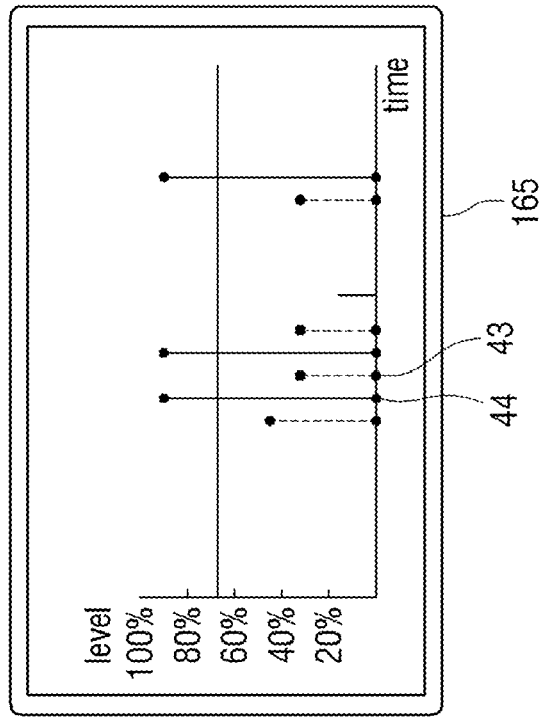

FIGS. 10A and 10B illustrate a screen showing an event level according to an embodiment, and a screen showing generally used event sensitivity, respectively. FIG. 10A shows a screen 165 displaying an event level, and FIG. 10B shows a screen 166 displaying a motion detection variation amount and a sensitivity baseline 169.

Generally, when a motion detection event occurs, after comparing a motion detection value corresponding thereto with a preset reference value, it is determined that an event has occurred when the motion detection value exceeds the reference value, and an image related to the event is stored.

On the other hand, when the motion detection value does not exceed the reference value, it is determined that an event has not occurred and a related image is not stored. The reference value used as a reference for determining whether an event has occurred is variably adjusted according to an event sensitivity arbitrarily set by a user.

As shown in FIG. 10B, the sensitivity baseline 169 may be displayed for allowing the user to arbitrarily and variably adjust the event sensitivity with respect to the motion detection value. If the motion detection value is located in an upper region 167 of the baseline 169, it is determined that an event has occurred, and if the motion detection value is located in a lower region 168 of the baseline 169, it is determined that no event has occurred.

For example, if the user moves down the sensitivity baseline 169 to adjust the event sensitivity upward, since the reference value for determining whether an event has occurred is reduced, it is determined that an event has occurred even in the case of detecting a slight motion. On the other hand, if the user moves up the sensitivity baseline 169 to adjust the event sensitivity downward, since the reference value for determining whether an event has occurred is increased, it is determined that an event has occurred only when a heavy motion is detected, and a slight motion detection is not determined as an event.

Therefore, when an image is stored using the event sensitivity, only an image of the event satisfying the event sensitivity is stored in the storage device, and the image that is not stored in the storage device cannot be retrieved when retrieving the event afterwards.

However, in the image pickup apparatus 1 according to an embodiment, when a change which needs to be observed in a surveillance area occurs, it is regarded as an event. Also, an event level and image for each event occurring in the surveillance area are stored.

For example, in the image pickup apparatus 1 according to an embodiment, regardless of the baseline, the motion events 43 and 44 having different event levels are all stored in the storage 15.

Therefore, unlike an image pickup apparatus using event sensitivity which may not be able to retrieve a certain event, an image pickup apparatus according to the embodiment is able to retrieve all the events and related images generated in the surveillance area. Furthermore, when retrieving an event, an appropriate search requirement for an event level can be set to efficiently retrieve an image related to the event.

In summary, the event sensitivity is a value which is set before a change occurs in the surveillance area. If the change in the surveillance area does not satisfy the event sensitivity, it is not determined as an event. On the other hand, the event level is a value measured after a change occurs in the surveillance area. All changes occurring in the surveillance area are regarded as events, and the event level enables the user to efficiently retrieve an image related to the events.

Figure 11:
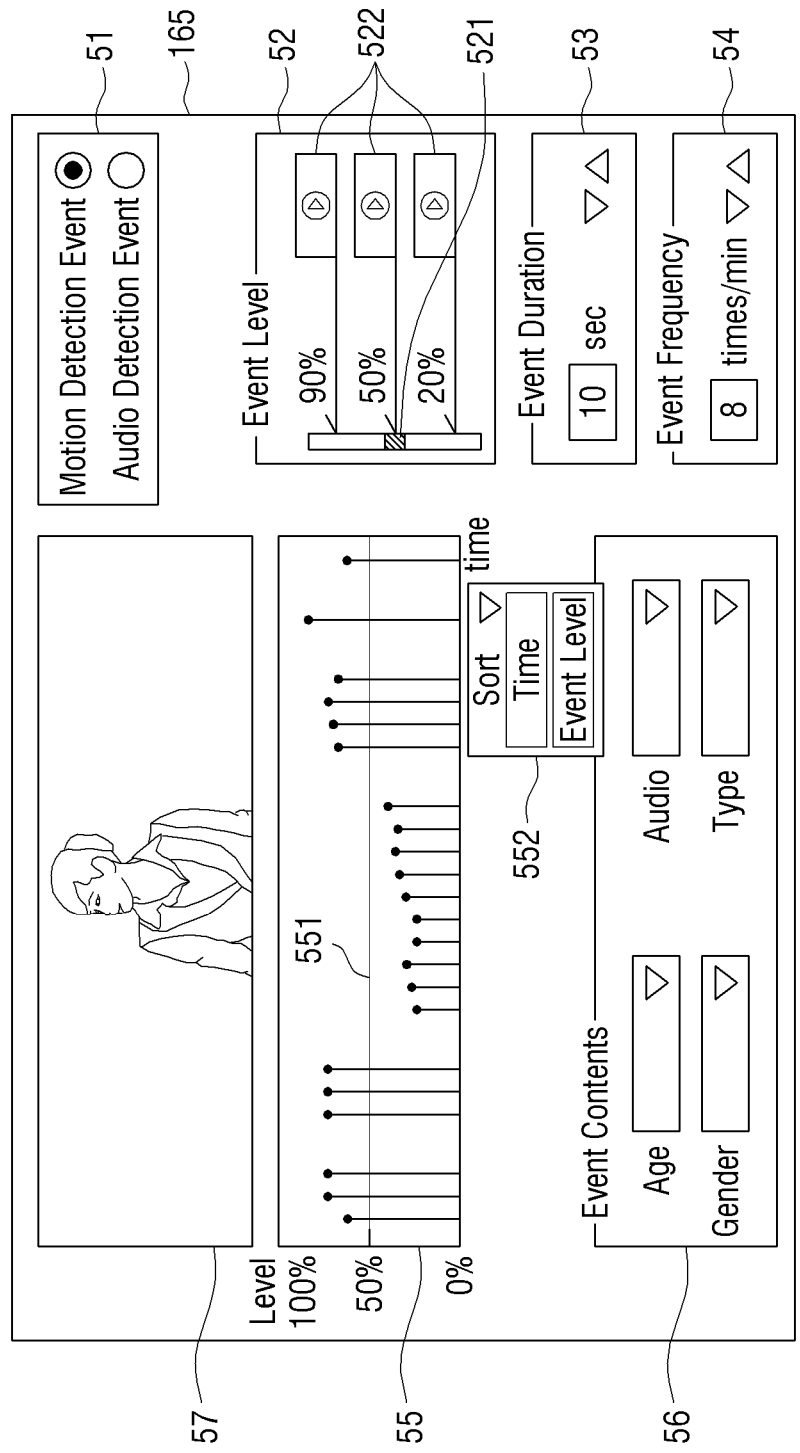
FIG. 11 illustrates an event search screen of an image pickup apparatus, according to an embodiment.

FIG. 11 illustrates an event search screen of an image pickup apparatus according to an embodiment. Referring to FIG. 11, an event search screen 165 which can be used when an event is retrieved through the user interface 13 is illustrated.

By using the event listing screen shown in FIGS. 6 to 9, the user can view an image and event contents of an event by selecting a symbol corresponding to each event using the input means. However, if the surveillance area is monitored for a long period of time and a large number of events occur, a search means is required in order for the user to more easily retrieve an event. FIG. 11 shows an event search screen provided such that the user can easily and efficiently perform an event search.

The event search screen 165 includes an event type selection section 51, an event listing section 55, search requirement selection sections 52, 53 and 54, a search content selection section 56 and an image output section 57.

The event type selection section 51 shows a list of event types detected in the surveillance area so as to select an event type to be searched. In FIG. 11, a motion detection event and an audio detection event are listed. When different types of event are detected in the surveillance area, different types of event may be listed in the event type selection section. In FIG. 11, a motion detection event is selected as an event to be searched. The event type selection section 51 may be configured to allow events to be selected alternatively or simultaneously.

The event listing section 55 outputs the events of which the type is selected by the event type selection section 51. The method of outputting the events by the event listing section 55 may employ the method shown in FIGS. 6 to 9. The method of outputting the events by the event listing section 55 may be changed through a sorting selection section 552. For example, when the sorting selection section 552 selects an event level, events may be outputted in order of event levels as shown in FIG. 7. FIG. 11 shows the events outputted using the method shown in FIG. 8.

The search requirement selection sections 52, 53 and 54 and the search content selection section 56 are components for receiving an input of conditions for event search from the user.

The search requirement selection sections 52, 53 and 54 may be configured to receive search requirements according to event attributes. The event attributes include an event level, an event duration, and an event frequency. The search module 16 retrieves an event according to the search requirements input to the search requirement selection sections 52, 53 and 54.

The event level selection section 52 may display a reference image thumbnail 522 according to the event level so that the user can appropriately input the search requirement for the event level. In FIG. 11, the reference image thumbnails 522 for event levels of 90%, 50% and 20% are displayed. The user can refer to each of the reference image thumbnails 522 and input a search requirement for a desired event level.

The user may input the search requirement for the event level by adjusting a bar 521. The position of a search baseline 551 of the event listing section 55 is adjusted according to the search requirement input by the user. For example, if the user sets the search requirement for the event level at 50%, the search baseline 551 is located at the event level of 50%. The event listing section 55 may not display an event having an event level below the search requirement, or may display the event with a dotted line.

Next, prior to describing the search requirements for the event duration and the event frequency, the event duration and the event frequency are defined with reference to FIG. 11. FIG. 11 shows events listed in order of time from 0:00:00 to 0:01:00 (1 minute). It is assumed that the event is detected every second, and the frequency of detection of the event may be changed according to the performance of the camera 17 and the setting of the user.

Figure 12:
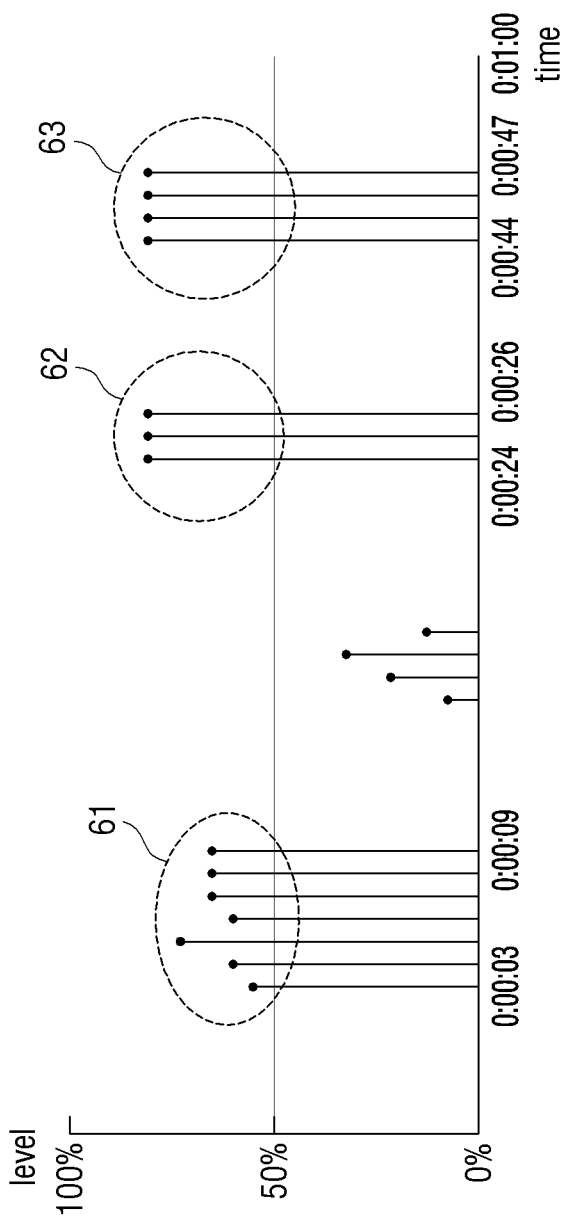
FIG. 12 shows events listed in order of time in an image pickup apparatus, according to an embodiment.

The event duration means the duration of an event having an event level higher than the search requirement for the event level. If continuous events having an event level equal to or higher than the search requirement for the event level are referred to as an event group, the event duration means the occurrence time of the event group. In FIG. 12, an event level of 50% is selected as the search requirement for the event level. Since a first event group 61 having an event level exceeding 50% lasts from 0:00:03 to 0:00:09, the duration of the first event group 61 is 6 seconds. Since a second event group 62 having an event level exceeding 50% lasts from 0:00:24 to 0:00:26, the duration of the second event group 62 is 2 seconds. Since a third event group 63 having an event level exceeding 50% lasts from 0:00:44 to 0:00:47, the duration of the third event group 63 is 3 seconds.

The event frequency means the frequency of an event group having an event level equal to or higher than the search requirement for the event level. Since there are three event groups, i.e., the first event group 61, the second event group 62, and the third event group 63, having an event level exceeding 50% from 0:00:00 to 0:01:00, the event frequency per minute is three.

Referring again to FIG. 11, the user can retrieve an event having a desired duration by inputting a search requirement for the event duration through the event duration selection section 53. For example, if the user selects a search requirement for the event duration as 10 seconds, the search module 16 may search the storage 15 for an event having an event duration of 10 seconds or more and output the search result to the event listing section 55. In this case, the search requirement for the event duration may be selected as one value, or may be selected as a certain range.

Also, the user can retrieve an event having a desired frequency by inputting a search requirement for the event frequency through the event frequency selection section 54. For example, if the user selects a search requirement for the event frequency as 5 times per 10 seconds, the search module 16 may search the storage 15 for an event group having a frequency of 5 times or more per 10 seconds with an event level equal to or higher than the search requirement and output the search result to the event listing section 55. In this case, the search requirement for the event frequency may be selected as one value, or may be selected as a certain range.

The search content selecting section 56 lists event contents detected in the surveillance area. In FIG. 11, the detected event contents include age, gender, audio and type.

Figure 13:
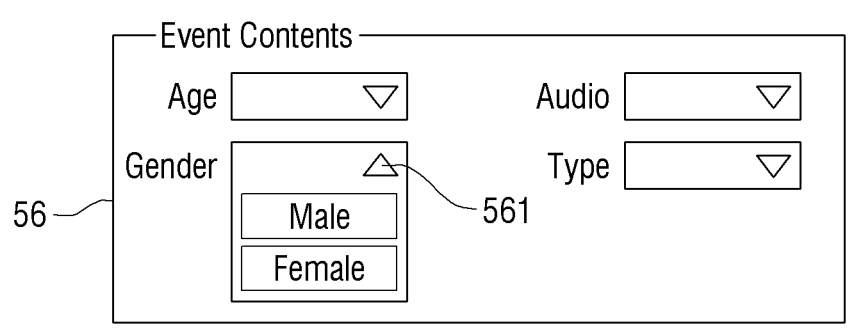
FIG. 13 shows a search content selecting section of the image capture apparatus according to an embodiment of the present invention.

Referring to FIG. 13, when the search content selecting section 56 selects a gender 561, event contents detected for gender are listed. In FIG. 13, male and female, which are event contents detected for gender, are listed. The user can alternatively or simultaneously select the event contents desired to be searched from among male and female. If the user selects the gender corresponding to the search requirement for the event content as female, the search module 16 may retrieve an event whose event content is female, and output the search result to the event listing section 55.

Referring again to FIG. 11, the user can retrieve an event by inputting an appropriate search requirement through the search requirement selection sections 52, 53 and 54 and the search content selection section 56. Further, the user can view the captured image corresponding to the event through the image output section 57 by selecting a symbol corresponding to the event retrieved using the input means in the event listing section 55.

In the embodiment shown in FIG. 11, the event level selection section 52 is configured such that a constant search requirement is input similarly to the baseline 49 shown in FIG. 8, but may be configured such that different search requirements are input according to time similarly to the baseline 49 shown in FIG. 9. Also, the event duration selection section 53, the event frequency selection section 54 and the search content selection section 56 may be configured such that different search requirements are input according to time.

At least one of the components, elements, modules or units (collectively "components" in this paragraph) represented by a block in the drawings such as FIG. 3 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art to which the inventive concept pertains should understand that the inventive concept may be practiced in other specific forms without changing the technical idea or essential features thereof. Therefore, the embodiments described herein are illustrative in all aspects and should not be understood as limiting. The scope of the inventive concept is shown by the claims below rather than the detailed description given above, and all changes or modifications derived from the meaning and the scope of the claims and their equivalents should be interpreted as belonging to the scope of the inventive concept.

What is claims is:

1. An event storage device comprising a processor and a memory, wherein the processor is configured to:
   receive images captured in a surveillance area;
   detect an event generated in the surveillance area; and
   store, in the memory, an image related to the event, among the received images, and an event level of the event only when the event level is higher than predetermined values set by a user interface,
   wherein the predetermined values are set to change depending on a time and a type of the event,
   wherein the type of the event comprise an audio detection event and a motion event, and
   wherein the event level indicates a degree of occurrence of an event, and is obtained by quantifying the event,
   wherein the predetermined values for the audio detection event and the predetermined values for the motion event are set differently at a specific time of a day in order to adapt to environment changes.

2. The event storage device of claim 1, wherein the event level is calculated based on a preset maximum event level.

3. The event storage device of claim 1, wherein in response to receiving a search request from a user, in order to output the stored image corresponding to the event level satisfying the search request, link information for matching the event level with the stored image is stored in the memory.

4. The event storage device of claim 1, wherein the type of the event further comprises at least one of a face detection event, a shape detection event, a human body detection event, a heat detection event, a door detection event, a temperature detection event, a humidity detection event, a shock detection event and a network connection detection event.

5. The event storage device of claim 4, wherein the processor is further configured to:
   analyze the detected event; and
   store event contents obtained from the analyzed event along with the stored image.

6. The event storage device of claim 5, wherein the processor is configured to analyze the detected event by performing video analytics (VA) on the stored image to obtain the event contents.

7. An event search device comprising a processor and a memory, wherein the processor is configured to:
   read events related to images stored in the memory;
   read event levels of the read events from the memory;
   receive, through an event search screen of a user interface, a search requirement for at least one event attribute;
   retrieve an image related to an event satisfying the search requirement from among the stored images; and
   display the retrieved image,
   wherein the user interface includes an event level selection section, which allows a user to input a search requirement for a desired event level, and an event listing section in which a position of a search baseline is adjusted according to the desired event level,
   wherein the event listing section displays a first event having an event level above these search baseline visually differentiated from a second event having an event level below the search baseline,
   wherein the search requirement has different values changing depending on a time and a type of the event, and
   wherein the type of the event comprise an audio detection event and a motion event,
   wherein the search requirement for the audio detection event and the search requirement for the motion event are set differently at a specific time of a day in order to adapt to environment changes.

8. The event search device of claim 7, wherein the processor is further configured to:
   read event contents related to the read events from the memory;
   receiving a search content; and
   displaying the retrieved image having an event content, from among the read event contents, satisfying the search content.

9. The event search device of claim 7, wherein the processor is further configured to display the event.

10. The event search device of claim 9, wherein the processor is further configured to sort the read events including the event, and display the sorted events based on at least one of the event levels or a time when the events have occurred.

11. The event search device of claim 9, wherein the processor is configured to display the event based on an event level of the event.

12. The event search device of claim 9, wherein the processor is configured to display the event when the event has an event level satisfying the search requirement.

13. The event search device of claim 9, wherein the processor is configured to display the event by indicating a level of the event and a time of the event.

14. The event search device of claim 7, wherein the event attribute comprises at least one of an event level, an event frequency and an event duration of the event.

15. The event search device of claim 14, wherein the processor is configured to:
   in response to receiving a search requirement for a specific event level, retrieve and display an image having the specific event level or higher;
   in response to receiving search requirements for the specific event level and a specific event duration, retrieve and display an image having the specific event level or higher and the specific event duration or longer; and in response to receiving search requirements for the specific event level and a specific event frequency, retrieve and display an image having the specific event level or higher and the specific event frequency or higher.

16. An event alarm device comprising a processor and a memory, wherein the processor is configured to:

receive from a user a request level for an event level, wherein the event level indicates a degree of occurrence of an event, and is obtained by quantifying the event;

receive an image captured in a surveillance area;

detect an event from the surveillance area;

calculate an event level of the detected event;

store the calculated event level in the memory; and output an alarm for the detected event in response to determining that the event level satisfies the request level, wherein the request level for the event level and a frequency of the alarm are set by the user to have different values changing depending on a time and a type of the event, wherein the type of the event comprise an audio detection event and a motion event, and wherein the alarm is output at the frequency of the alarm set by the user when the event level satisfies the request level, wherein the request level for the audio detection event and the request level for the motion event are set differently at a specific time of a day in order to adapt to environment changes.

17. The event alarm device of claim 16, wherein the processor is further configured to allow the detected event for the output alarm to be designated as a user's interest event.

18. The event alarm device of claim 17, wherein the processor is further configured to adjust the request level for the designated event.

* * * * *